United States Patent
Kim et al.

(10) Patent No.: US 10,843,928 B2
(45) Date of Patent: Nov. 24, 2020

(54) METHOD FOR PRODUCING SYNTHETIC HECTORITE AT LOW TEMPERATURE AND ATMOSPHERIC PRESSURE

(71) Applicant: LG CHEM, LTD., Seoul (KR)

(72) Inventors: Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/074,385

(22) PCT Filed: Sep. 29, 2017

(86) PCT No.: PCT/KR2017/011051
§ 371 (c)(1),
(2) Date: Jul. 31, 2018

(87) PCT Pub. No.: WO2018/088697
PCT Pub. Date: May 17, 2018

(65) Prior Publication Data
US 2019/0337811 A1   Nov. 7, 2019

(30) Foreign Application Priority Data
Nov. 14, 2016  (KR) .................. 10-2016-0151388

(51) Int. Cl.
*C01B 33/38*   (2006.01)
*C01B 33/40*   (2006.01)
(52) U.S. Cl.
CPC ................... *C01B 33/405* (2013.01)
(58) Field of Classification Search
CPC .................................................. C01B 33/405
See application file for complete search history.

(56) References Cited

U.S. PATENT DOCUMENTS

| | | |
|---|---|---|
| 3,671,190 A | 6/1972 | Neumann |
| 4,054,537 A | 10/1977 | Wright et al. |
| 2003/0077337 A1 | 4/2003 | Shaw et al. |
| 2006/0147367 A1 | 7/2006 | Temperly et al. |

FOREIGN PATENT DOCUMENTS

| | | |
|---|---|---|
| CN | 103204511 | 7/2013 |
| EP | 0889004 | 1/1999 |
| GB | 1432770 | 4/1976 |
| KR | 10-0748211 | 8/2007 |

OTHER PUBLICATIONS

Jang et al. "Synthesis of Hectorite by Hydrothemal Method," J. Miner. Soc. Korea 20(1):1-6 (2007). (English Language Abstract provided).
Torii, K. and T. Iwasaki, "Synthesis of New Trioctaherdral Mg-Smectite," Chemistry Letters: pp. 2021-2024 (1986).
Supplementary Search Report of European Patent Office in Appl'n No. EP17870504, dated Jan. 9, 2019.

*Primary Examiner* — Stuart L Hendrickson
(74) *Attorney, Agent, or Firm* — Dentons US LLP

(57) ABSTRACT

The present invention relates to a method for producing synthetic hectorite at a low temperature and atmospheric pressure and synthetic hectorite produced by the same, and more particularly, to a method for producing synthetic hectorite and synthetic hectorite produced by the same in which: a step of forming Li—Mg precipitates is introduced and thereby ensures an improved crystallization reaction condition and synthetic hectorite having excellent properties; and composition ratios of reactants are controlled, and thus, property control is easy.

7 Claims, 3 Drawing Sheets

< Prior Art >

< Prior Art >

METHOD FOR PRODUCING SYNTHETIC HECTORITE AT LOW TEMPERATURE AND ATMOSPHERIC PRESSURE

CROSS-REFERENCE TO RELATED APPLICATIONS

This application is a National Stage Application of International Application No. PCT/KR2017/011051 filed on Sep. 29, 2017, which claims priority to and the benefit of Korean Patent Application No. 10-2016-0151388, filed on Nov. 14, 2016, in the Korean Intellectual Property Office, the disclosure of which is incorporated herein in its entirety by reference for all purposes as if fully set forth herein.

TECHNICAL FIELD

The present invention relates to a method for producing synthetic hectorite at a low temperature and atmospheric pressure and synthetic hectorite produced using the same.

BACKGROUND ART

Rapid industrial development requires substances having various kinds of characteristics. In particular, global interest in nano-technology has led to researches focused on a clay mineral having the smallest particle size from among minerals present in nature.

Among these, hectorite is a clay mineral belonging to the saponite subgroup from among smectite group which belongs to the 2:1 layer type from among a rough classification of clay minerals. The saponite subgroup includes hectorite and saponite. Similarly to montmorillonite, a weak layer charges are generated in hectorite by substituting $Li^+$ for $Mg^{2+}$ on an octahedral plate, and these layer charges cause expanding or swelling property. This weakness of interlayer binding force means that the binding force of positive ions present between layers is not so large enough to firmly bind 2:1 layers, and further, hectorite is easily swelled due to affinity with water.

Hectorite is a clay mineral which has a layered crystalline structure, very small particle sizes (20-30 nm), and a high swelling property and thickening capacity. In particular, since showing a light color and containing no iron, hectorite is a harmless mineral with no color change. Due to such characteristics, hectorite is being used in various fields, such as a material of paint exhibiting a long-term anti-smell effect, a suspended solid, a stabilizer for an emulsion, a cosmetic material, and a medicine for allergy. Table 1 below shows the characteristics of hectorite.

TABLE 1

| Properties of hectorite (http://webmineral.com/data/Hectorite.shtml) | |
|---|---|
| Chemical Composition | $Na_{0.4}(Mg_{5.5}Li_{0.4})Si_{7.9}O_{20}(OH,F)_4 \cdot nH_2O$ |
| Crystal System | Monoclinic(S.G.: C2/m) |
| Cleavage | [001] Perfect |
| Color | White |
| Density | 2~3 (average 2.5) |
| Diaphaniety | Translucent Opaque |
| Fracture | Uneven |
| Habit | Aggregates |
| Hardness | 1~2 |
| Luminescence | Fluorescent |
| Luster | Earthy [Dull] |
| Streak | White |

At present, commercialized products include Laponite of BYK Co. and synthetic hectorite produced by Kunimine Industries Co. in Japan.

Since a hectorite-specific aqueous solution property is shown due to crystalline defects formed by ion exchanges between $Mg^{2+}$ and $Li^+$ in a magnesium silicate-based layered structure, synthetic hectorite is being generally produced under a high-temperature/high-pressure reaction condition to form a crystalline phase. However, expensive production equipment and accompanying complicated production processes are required due to the high-temperature/high-pressure reaction condition. In addition, since hectorite particles produced at 100° C. or lower are known to be not swollen with water, various kinds of research on production processes have been carried out to solve this using a low-temperature, atmospheric-pressure reaction condition, but a long reaction time such as 60-100 hours is required, and thus, such research is difficult to be applied to actual processes.

In related arts, since application to various material industries is difficult due to such limitations, a demand for a new production process which is easy and economical arose, and accordingly, a new, simple, economical method for producing synthetic hectorite while maintaining properties of existing synthetic hectorite has been developed.

RELATED ART DOCUMENT (Patent document 1) Korean Patent Publication No. 10-0748211 (Aug. 9, 2007).

DISCLOSURE OF THE INVENTION

Technical Problem

An aspect of the present invention provides a simple, economical method for producing synthetic hectorite such that a crystallization reaction may be carried out under a low-temperature/atmospheric-pressure condition by introducing a step of forming a Li—Mg precipitate.

Another aspect of the present invention provides a method for producing synthetic hectorite the properties of which are easily controlled by controlling composition ratios of reactants.

Still another aspect of the present invention provides synthetic hectorite produced by the method for producing synthetic hectorite and having excellent properties such as dispersibility, swellability, and light transmittance.

Technical Solution

According to an aspect of the present invention, there is provided a method for producing synthetic hectorite, the method including the steps of: 1) preparing a precursor solution mixture including a lithium (Li) precursor, a fluorine (F) precursor, and a magnesium (Mg) precursor; 2) adding a basic catalyst into the precursor solution mixture and forming a Li—Mg precipitate; and 3) adding a silica (Si) precursor into the Li—Mg precipitate and carrying out a crystallization reaction.

In addition, the present invention provides synthetic hectorite produced by the producing method and expressed by Formula 1 below.

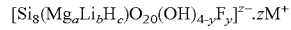  [Formula 1]

(In Formula 1, 4.9≤a≤5.7, 0<b≤1.05, 0<c<2, 5<(a+b+c)<8, 0<y<1, z=12−2a−b−c, and M is sodium (Na) or lithium (Li).)

Advantageous Effects

A method for producing synthetic hectorite at a low temperature and atmospheric pressure according to the present invention allows a crystallization reaction to be carried out under a low temperature and an atmospheric pressure by introducing a step of forming a precipitate prior to the crystallization reaction. Thus, a high-temperature, high-pressure reaction condition is not required, and therefore, expensive producing equipment and accompanying complicated processes are not required, and since hectorite may be produced through a simple, economical process in a short time, production cost reduction and a remarkable increase in production efficiency may be achieved.

In addition, the low-pressure, atmospheric-pressure method for producing synthetic hectorite according to the present invention may manufacture hectorite having excellent properties such as dispensability, swellability, and light transmittance even when the synthetic hectorite is produced under a low-temperature/atmospheric-pressure condition in a short time.

In addition, the low-temperature, atmospheric-pressure method for producing synthetic hectorite according to the present invention controls composition ratios of reactants, and thus, may easily control the major application properties of synthetic hectorite, such as dispensability, swellability, and light transmittance.

BRIEF DESCRIPTION OF DRAWINGS

The following drawings attached to the specification illustrate specific examples of the present invention, and serve to enable technical concepts of the present invention to be further understood together with detailed description of the invention given below, and therefore, the present invention should not be interpreted only with matters in such drawings.

MODE FOR CARRYING OUT THE INVENTION

Hereinafter, the present invention will be explained in more detail to assist the understanding of the present invention. Terms or words used in the specification and claims should not be interpreted as limited to a commonly used meaning or a meaning defined dictionaries, and should be interpreted as having a meaning that is consistent with their meaning in the context of the technical idea of the invention, based on the principle that an inventor may properly define the meaning of the words or terms to best explain the invention.

Hectorite particles are crystalline substances exhibiting high water dispersibility, water swellability, transparency, gel formability, and thixotrophy, and are naturally found, but intracrystalline impurities are unremovable, and therefore, synthetic hectorite is being produced by using a reactant for commercial applications, such as viscosity changer, paint additive, and personal care fields. In general, synthetic hectorite is being produced under a high-temperature/high-pressure reaction condition to ensure a hectorite-specific solution-phase property shown due to crystalline defects formed through an ion exchange between $Mg^{+2}$ and $Li^+$ in a magnesium silicate-based layered structure.

However, there are limitations of an increase in production costs caused by expensive production equipment due to the high-temperature/high-pressure reaction condition and accompanying complicated production processes, a decrease in production efficiency, and stability. To solve this, the present invention provides a novel method for producing synthetic hectorite, the method being capable of producing synthetic hectorite having an excellent property in a short time using a low-temperature/atmospheric-pressure reaction condition.

A method for producing synthetic hectorite according to an embodiment of the present invention includes the steps of:

1) preparing a precursor solution mixture including a lithium (Li) precursor, a fluorine (F) precursor, and a magnesium (Mg) precursor;

2) adding a basic catalyst into the precursor solution mixture and forming a Li—Mg precipitate; and 3) adding a silica (Si) precursor in the Li—Mg precipitate and carrying out a crystallization reaction.

Figure 1:
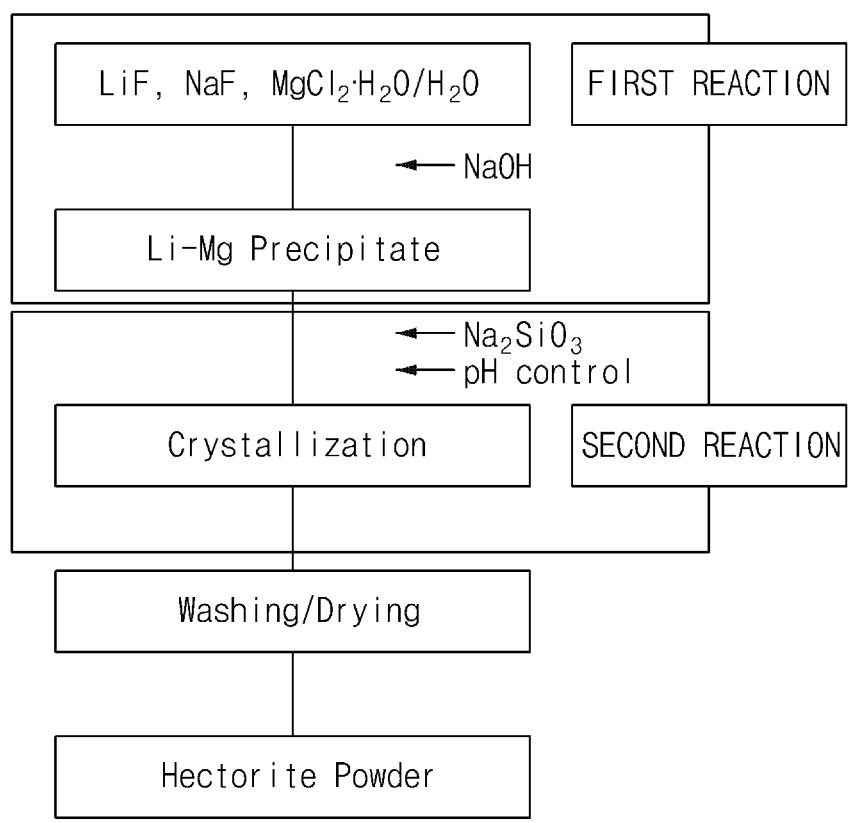
FIG. 1 is a flowchart schematically illustrating processes of a method for producing synthetic hectorite according to an embodiment of the present invention.
Figure 2:
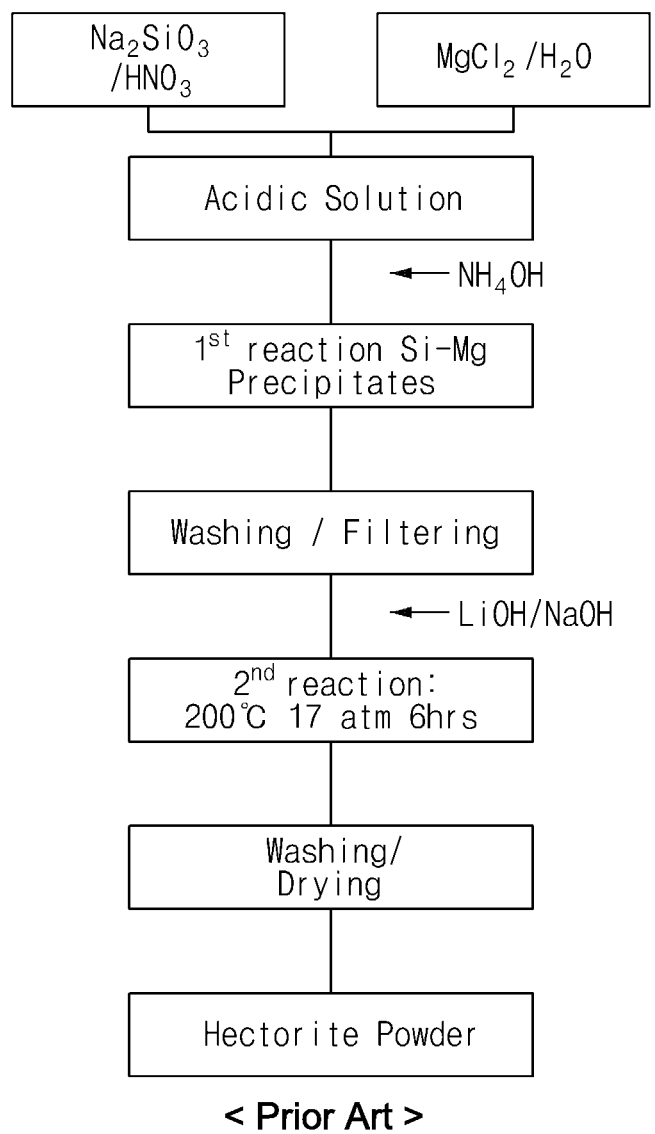
FIG. 2 is a flowchart schematically illustrating processes of a method for producing synthetic hectorite using conventional high-temperature/high-pressure processes according to comparative example 1 of the present invention.
Figure 3:
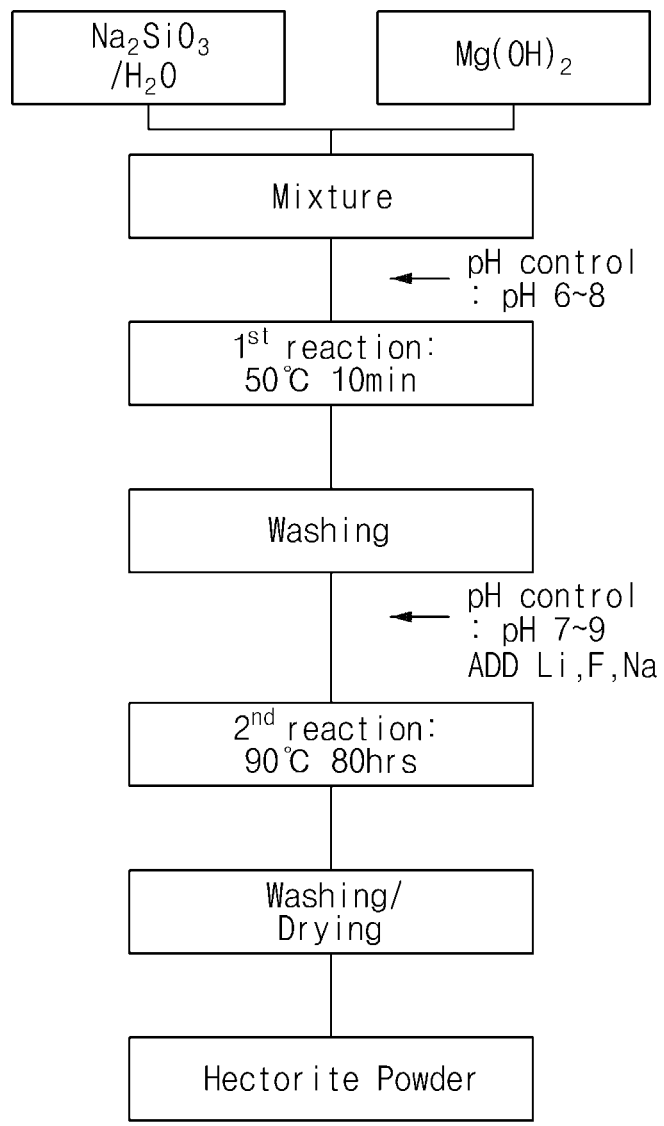
FIG. 3 is a flowchart schematically illustrating processes of a method for producing synthetic hectorite using conventional low-temperature/atmospheric-pressure processes according to comparative example 2 of the present invention.

Hereinafter, with reference to FIG. 1, a method for producing synthetic hectorite according to an embodiment of the present invention will be described in detail.

Step 1)

Step 1) according to an embodiment of the present invention is a step for preparing a precursor solution mixture for forming Li—Mg precipitates, and is characterized by preparing a precursor solution mixture including a lithium (Li) precursor, a fluorine (F) precursor, and a magnesium (Mg) precursor.

The precursor solution mixture of the present invention is prepared for firstly forming the Li—Mg precipitate before producing hectorite, and is characterized by including no silica precursor. This is because the silica precursor has a greater reactivity to the magnesium precursor than to the lithium precursor, and therefore, when the silica precursor is further included, there is a concern that a Si—Mg precipitates is competitively formed with the Li—Mg precipitate.

Accordingly, the present invention is characterized in that in order to suppress a reaction of forming the Si—Mg precipitate and only form the Li—Mg precipitate, the precursor solution mixture including the lithium (Li) precursor, fluorine (F) precursor, and magnesium (Mg) precursor is prepared. In addition, a Li—Mg—Si complex precipitate is formed by a crystalline reaction with a silica precursor which is added after the formation of the Li—Mg precipitate, and thus synthetic hectorite may be prepared.

In the present invention, a precursor means a substance before being changed into a specific substance in a reaction, and means a substance before being changed into a specific substance which can be finally obtained in a chemical reaction or the like.

As the lithium (Li) precursor, which can be used to manufacture the precursor solution mixture, includes one or more selected from the group consisting of lithium fluoride (LiF), lithium hydroxide (LiOH), lithium chloride (LiCl), lithium carbonate ($Li_2CO_3$), and lithium sulfate ($Li_2SO_4$) may be used, and more specifically, lithium fluoride (LiF) may be used. In the present invention, the lithium precursor firstly forms the Li—Mg precipitates and consequently serves as a raw material of $Li^+$ which substitutes $Mg^{2+}$ in the octahedron of hectorite, and lithium fluoride is particularly used because lithium fluoride is more effective for a hectorite crystallization reaction.

In addition, fluorine precursors which can be used to manufacture the precursor solution mixture of the present invention includes one or more selected from the group consisting of hydrofluoric acid (HF), sodium fluoride (NaF), fluosilicic acid (($H_3O)_2(SiF_6)$), and sodium silico fluoride ($Na_2(SiF_6)$), and more specifically, sodium fluoride may be used. In the present invention, the fluorine precursor functions to promote the hectorite crystallization reaction, and sodium fluoride is used because a reaction, in which Li—Mg precipitates progress into a Si—Mg precipitates, is suppressed by excess $Na^+$, and the selectivity of a reaction of forming Li—Mg—Si precipitates may be improved.

In addition, magnesium precursors which can be used to manufacture the precursor solution mixture of the present invention includes one or more selected from the group consisting of magnesium carbonate ($MgCO_3$), magnesium sulfate ($MgSO_4$), magnesium chloride ($MgCl_2$), and magnesium hydroxide ($Mg(OH)_2$), and more specifically, magnesium chloride ($MgCl_2$) may be used. In the present invention, the magnesium precursor should firstly form Li—Mg precipitates and react with a silica precursor added later to form Li—Mg—Si complex precipitates, and magnesium chloride is most favorable in consideration of reactivity with Si, a purchase price and purchase availability, solubility to an aqueous solution, and ease of adjusting pH of aqueous solution, and the like.

In addition, according to an embodiment of the present invention, the molar ratios of the lithium precursor and the fluorine precursor are characterized to be 1:1 to 1:10, more specifically, 1:1 to 1:5. This is because major application properties of synthetic hectorite, such as dispensability, light transmittance, and swellability, may be controlled by adjusting the molar ratios of the lithium precursor and the fluorine precursor.

Specifically, when the molar ratios of the lithium precursor is out of the above-mentioned numerical range and is too small, the Li—Mg precipitates may not be easily formed, and the amount of $Li^+$ which may substitute $Mg^{2+}$ of synthetic hectorite is reduced, and thus, the properties such as water dispensability or swellability may not be satisfactory. In addition, when the molar ratios of the lithium precursor is out of the above-mentioned numerical range and is too excessive, the reactivity improving effect due to the fluorine precursor is decreased, and there may be a limitation in that the purpose of the present invention to manufacture synthetic hectorite in a short time under a low-temperature/high-pressure condition.

Step 2)

Step 2) according to an embodiment of the present invention is a step for forming the Li—Mg precipitates, and is characterized by adding a basic catalyst into a precursor solution mixture including a lithium precursor, a fluorine precursor, and a magnesium precursor In the present invention, this step, in which synthetic hectorite is not directly produced, but Li—Mg precipitates are firstly formed, is a step for improving a general high-temperature/high-pressure crystallization reaction process in related arts into a low-temperature/atmospheric-pressure crystallization reaction condition so as to allow the crystallization of synthetic hectorite to be more easily performed. This step corresponds to the most characterizing step in which, in forming a layered structure of hectorite: a layered Li—Mg precipitates to be formed inside are firstly formed; a crystalline hectorite having a layered structure is then secondly synthesized through a binding reaction with a silica precursor, and a sufficient swelling occurs in an aqueous solution; and thus, major application properties of an aqueous solution of hectorite which are mainly used in an aqueous solution are secured.

The Li—Mg precipitates according to the present invention have reactivity higher than Si—Mg precipitates and thus, a crystallization reaction may easily be carried out even under a low-temperature/atmospheric-pressure reaction condition. Thus, a high-temperature/high-pressure reaction condition is unnecessary, and therefore, expensive production equipment and accompanying complicated processes are unnecessary, and since hectorite may be produced through a simple, economical process in a short time, production cost may be reduced and production efficiency may be remarkably increased.

Basic catalysts which can be used to form the Li—Mg precipitates according to the present invention includes one or more selected from the group consisting of sodium hydroxide (NaOH), potassium hydroxide (KOH), calcium hydroxide ($Ca(OH)_2$), ammonium hydroxide ($NH_4OH$), and sodium carbonate ($Na_2CO_3$), and more specifically, sodium hydroxide (NaOH) may be used in the present invention.

In addition, the basic catalyst may be added in an amount such that the pH of a precursor solution mixture is 7 to 10, or more specifically, 8.5 to 10. When the basic catalyst is added in an amount which is too small or excessive to be out of the above-mentioned range, the Li—Mg precipitates may not be formed.

Meanwhile, according to an embodiment of the present invention, the Li—Mg precipitates may be formed at once by adding the basic catalyst into a precursor solution mixture which includes all of the lithium precursor, the fluorine precursor, and the magnesium precursor. However, the Li—Mg precipitates may be firstly formed by adding the basic catalyst into a precursor solution mixture which includes the lithium precursor and the fluorine precursor, the magnesium precursor may be then added, and the Li—Mg precipitates may be gradually formed via a step of adjusting PH using an acidic catalyst and/or a basic catalyst.

Step 3)

Step 3) according to an embodiment of the present invention is a step for carrying out a crystallization reaction for forming Li—Mg—Si composite precipitates, that is, gel-type synthetic hectorite, and is characterized by being carried out by adding a silica (Si) precursor into the Li—Mg precipitates.

In a method for producing synthetic hectorite according to an embodiment of the present invention, unlike in the related producing method in which Si—Mg precipitates (magnesium silicate) are formed, and then a crystallization reaction is carried out by adding a lithium precursor, Li—Mg precipitates having an excellent reactivity are firstly formed, a silica (Si) precursor is then added, and thus, a crystallization reaction may be more easily carried out in a short time even under a low-temperature/atmospheric-pressure condition.

The crystallization reaction of step 3) according to an embodiment of the present invention is characterized by being carried out at a temperature of 70-110° C., more specifically, at a temperature of 80-100° C. and under an atmospheric pressure, more specifically, under a pressure condition of 1-1.21 bar.

Meanwhile, the atmospheric pressure means a normal pressure or an atmospheric pressure, which is a pressure when the pressure is not particularly lowered or raised without using a high-pressure apparatus such as an autoclave.

In the present invention, the Li—Mg precipitates having excellent reactivity are firstly produced, and then, synthetic hectorite are secondly produced. Therefore, synthetic hectorite may be produced even under a low-temperature/atmospheric-pressure condition compared to related methods of producing synthetic hectorite.

When the temperature of the crystallization reaction according to the present invention is 70° C. or lower, the crystallization reaction may not occur or the reaction speed is so slow that there may be a limitation in that the total process time of producing synthetic hectorite is increased. When the crystallization reaction temperature exceeds 110° C., the crystallization speed may be increased, but since the reaction is carried out in an aqueous solution phase, the reaction should be carried out under a high pressure. In this case, production costs may be increased and production efficiency may be decreased because a high-pressure and expensive equipment is required, and there may be a problem in stability caused by using a high-pressure dangerous equipment, and thus, there may be a limitation in that it is impossible to providing a simple, economical producing method under a low temperature which is targeted by the present invention.

In addition, when the pressure of the crystallization reaction according to the present invention is carried out under a pressure lower than the atmospheric pressure, the crystallization reaction may not occur, and when the reaction is carried out under a higher pressure than the atmospheric pressure, a high-pressure, expensive equipment is required, production costs may rise, and the production efficiency may be decreased. And thus, there may be a safety problem caused by using a high-pressure, dangerous equipment, Therefore, there may be a limitation in that an effect of providing a simple, economical producing method under a low temperature which is targeted by the present invention.

The method for producing synthetic hectorite is characterized in that the method may not only be produced under a low temperature/atmospheric pressure as described above, but also be produced in a short crystallization reaction time of 10-40 hours.

Most of the total process time for producing synthetic hectorite is the time required for the crystallization reaction step. Therefore, when the time required for the crystallization reaction step is reduced, the total process time required for producing synthetic hectorite may be reduced, and thus, the production efficiency of synthetic hectorite may be maximized.

Silica precursor which can be used in the present invention may indicate a diluted solution in which distilled water is added into water glass and mixed, and the water glass may be sodium silicate ($Na_2SiO_3$) which is an alkali silicate salt which is obtained by melting silicon dioxide ($SiO_2$) and alkali, and more specifically, a liquid sodium silicate No. 3 (KS certified) product of Youngil Chemical Co., Ltd. may be used. In addition, a water glass solution used in the present invention may contain 20-40 wt %, and more specifically, 28-30 wt % of silicon dioxide ($SiO_2$).

According to an embodiment, the silica precursor and the magnesium precursor are characterized by being added in a molar ratio of 2:1 to 1:1 according to the stoichiometry of synthetic hectorite.

According to an embodiment of the present invention, in order to allow a crystallization reaction between the Li—Mg precipitates and the silicon precursor, the pH of a reaction solution needs to be adjusted by adding an acidic catalyst or a basic catalyst.

In the present invention, the acidic catalysts to be used may include one or more selected from the group consisting of hydrochloric acid, nitric acid, acetic acid, and sulfuric acid, and more specifically, hydrochloric acid may be used, and the basic catalyst is as described above.

In addition, the acidic catalyst or the basic catalyst may be added in an amount of a degree by which the crystallization reaction may occur, that is, in an amount such that the pH of the reaction solution becomes 8.5 to 10.

In addition, according to an embodiment, the method for producing synthetic hectorite of the present invention is characterized by passing through no washing or filtering step prior to the crystallization reaction of step 3).

In order to induce an improvement in reactivity of a crystallization reaction according to addition of an Li precursor after the formation of the Si—Mg precipitates, a high-temperature/high-pressure producing method and low-temperature/atmospheric-pressure producing method of related arts required a two-step washing and/or filtering process prior to the crystallization reaction as a process for removing excess salt of $Na^+$, $Cl^-$, or the like.

However, as the producing method of the present invention introduces a step of forming the Li—Mg precipitates, reactivity is increased, and the crystallization reaction is possible even in the presence of an excess salt. Thus, the producing method of the present invention is characterized in that it is unnecessary to pass through an excess salt removing step, and synthetic hectorite may be produced through a one-pot reaction and therefore be produced in a total process time of 10 to 40 hours.

In addition, according to an embodiment of the present invention, the method for producing synthetic hectorite of the present invention may further include step 4} of performing washing and drying after the crystallization reaction.

Step 4) is a step for removing impurities or excess salts and drying gel-type synthetic hectorite, thereby producing powder-type synthetic hectorite, and is characterized in that washing and drying are carried out after the crystallization step.

A reaction solution which includes the gel-type synthetic hectorite may contain a great amount of unreacted precursor materials, by-products, or salts of $Na^+$, $Cl^-$, or the like. Accordingly, to increase the purity of synthetic hectorite, a step of washing by using a washing solution may be carried out.

As a solvent which may be used in the present invention, a non-polar organic solvent, such as distilled water, isopropyl alcohol, hexane, heptane, xylene, or cyclohexane, may be used, and more specifically, distilled water may be used in the present invention.

In addition, after the washing, a filtering step of separating solid/liquid in a moisture content of 100% or less may further be carried out, and the washing and drying step is repeated one to three times and may thereby improve the purity of synthetic hectorite.

After the washing and filtering step, a step may further be carried out, in which the gel-type synthetic hectorite is separated by centrifugation or dried by using a press filter, and powder-type synthetic hectorite may be produced, and after the drying, the synthetic hectorite is pulverized so as to have desired particle diameters according to purposes of use.

In addition, the present invention provides synthetic hectorite which is produced by the producing method of the present invention and is expressed by Formula 1 below.

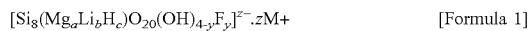
[Formula 1]

(In Formula 1 above, 4.9≤a≤5.7, 0<b≤1.05, 0<c<2, 5<(a+b+c)<8, 0<y<1, z=12−2a−b−c, and M is sodium (Na) or lithium (Li).)

In addition, unlike the synthetic hetorite which is produced by a related low-temperature producing method and is not swollen by water, the hectorite of the present invention is characterized by having excellent swellability and dispersibility and exhibiting light transmittance of 90% or more in an aqueous solution of 2 wt %, and viscosity of 5.4-400 cP.

The viscosity was measured by using a DV3T viscometer (Spindle LV2) of Brookfield Co. after dispersing using a 500 rpm magnetic stirrer for 6-24 hours.

Synthetic hectorite is applied mainly in an aqueous solution phase, and dispersibility according to a measurement of light transmittance and a viscosity change in an aqueous solution according to time are applied as major properties. In general, the hectorite produced at 100° C. or lower is known to be not dispersed and not swollen in water even though exhibiting a hectorite-specific crystalline phase. (Torri et al. 1986, Torii, 1996)

However, the method for producing synthetic hectorite according to the present invention is characterized in that: major properties thereof may be adjusted by adjusting the ratio of Li and F; Li—Mg precipitates are firstly formed, and then, a complex crystallization reaction with a silica precursor is secondly induced, so that a reaction time is short, the processes are simple, and nevertheless, water dispersibility measured as light transmittance of 90% or more in an aqueous solution of 2 wt % is excellent; and an viscosity increasing effect may be controlled from a low viscosity to a high viscosity.

Hereinafter, exemplary embodiments of the present invention will be described in detail so as to be easily implemented by those skilled in the art. The present disclosure may, however, be embodied in different forms and should not be construed as limited to the embodiments described herein.

Example 1

NaOH was added into a precursor solution mixture in which 0.01875 mol of LiF, 0.01875 mol of NaF, and MgCl₂.6H₂O 0.075 mol was added into distilled water such that the pH of the solution became 8.5 to 10, and thus, Li—Mg precipitates were firstly produced.

Into the Li—Mg precipitates, 0.1 mol of Water glass (Na₂SiO₃) (liquid sodium silicate No. 3 of Youngil Chemical Co.) containing 28-30 wt % of silicon dioxide was added, the pH of the resultant was adjusted to 8.5 to 10, and a second crystallization reaction was carried out for 40 hours at a temperature of 85° C. and under a pressure condition of 1 bar. Subsequently, the precipitates formed in the crystallization reaction was washed by using distilled water and then separated into solids/liquids having moisture contents of 100% or less, and after repeating the above process one to three times, the resultant was dried and pulverized, and thus, powder-type synthetic hectorite particles were produced.

Examples 2 to 5

Powder-type hectorite particles were produced by using the same method as in example 1 above, except that molar ratios and reaction conditions shown in Table 2 below were used in example 1 above.

Comparative Example 1

Into 0.083 mol of water glass (Na₂SiO₃), 0.158 mol of nitric acid (HNO₃) was added to thereby prepare 200 ml of water glass solution, and then 0.056 mol of MgCl₂.6H₂O was dissolved into distilled water to prepare 200 ml of MgCl₂ solution. The water glass solution and the MgCl₂ solution were mixed, 100 ml of ammonia (NH₄OH) diluted solution were then added to manufacture Si—Mg precipitates under pH 6-8.

Subsequently, to remove excess salts, the Si—Mg precipitates were washed and then dispersed in distilled water to prepare as 400 ml of solution. Then, 100 ml of reaction solution in which 0.006 mol of LiOH.H₂O and 0.007 mol of NaOH were dispersed was added and a second crystallization reaction was then carried out for 6 hours under a condition of the temperature of 220° C. and the pressure of 21.7 bar.

Subsequently, the precipitates formed in the crystallization reaction was washed by using distilled water and then separated into solids/liquids having moisture contents of 100% or less, and after repeating the above process one to three times, the resultant was dried and pulverized, and thus, powder-type synthetic hectorite particles were produced.

Comparative Example 2-1

0.1 mol of Water glass (Na₂SiO₃) was added to prepare 100 ml of water glass solution, 0.075 mol of MgCl₂.6H₂O was dissolved into distilled water to prepare 100 ml of solution, an ammonia (NH₄OH) solution was added to manufacture Mg(OH)₂ precipitates at pH 8, and then the resultant was separated into solids/liquids and washed to manufacture a Mg(OH)₂ solution.

A first reaction in which the water glass solution and the Mg(OH)₂ solution was mixed and then adjusted to pH 6 to 8, and then, Si—Mg precipitates were produced for 10 minutes under a temperature of 50° C. and the atmospheric pressure.

Subsequently, to remove excess salts, the Si—Mg precipitates were washed and then dispersed in distilled water to prepare as 300 ml of solution. Then, 100 ml of reaction solution in which 0.007 mol of LiOH.H₂O, 0.007 mol of LiCl and 0.007 mol of LiF were dispersed was added and then adjusted to pH 8 to 10, and a second crystallization reaction was then carried out for 80 hours under a condition of the temperature of 90° C. and the atmospheric pressure.

Subsequently, the precipitates formed in the crystallization reaction was washed by using distilled water and then separated into solids/liquids having moisture contents of 100% or less, and after repeating the above process one to three times, the resultant was dried and pulverized, and thus, powder-type synthetic hectorite particles were produced.

Comparative Examples 2-2 and 2-3

Powder-type hectorite particles were produced by using the same method as in comparative example 2-1 above, except that molar ratios and reaction conditions shown in Table 2 below were used in example 2-1 above.

Experimental Example 1: Viscosity Measurement

A 2 wt % of aqueous solution of the synthetic hectorite produced in examples 1 to 5 and comparative examples 1 to 2-3 were sufficiently filled in a beaker of having diameter of 4 cm or greater up to a height of 8 cm or higher, and a viscosity value measured at a speed of 50 rpm was obtained by using a viscometer DV3T (LV) and LV2 spindle of Brookfield Co., and the results are shown in Table 2 below.

Experimental Example 2: Light Transmittance Measurement

Light transmittance of the synthetic hectorite produced in examples 1 to 5 and comparative examples 1 to 2-3 was measured from a 2 wt % aqueous solution of the synthetic hectorite by using a Hazemeter HM-150 of Murakami Color Research Laboratory Co., and the results are shown in Table 2 below.

Meanwhile, in comparative example 2-1, in which a step of forming Li—Mg precipitates and producing is carried out under a low-pressure/atmospheric-pressure condition, synthetic hectorite was produced, but it could be understood that the transmittance thereof is remarkably decreased and the reaction time was 80 hours, increased even up to 2 times approximately.

In comparative example 2-2 in which the same producing method as that in comparative example 2-1 was used, and the reaction time was reduced to 40 hours, it may be confirmed that since a sufficient reaction was not carried out, precipitates occur in the aqueous solution, the viscosity control was thereby impossible, and measurement of other major properties were impossible.

In addition, in comparative example 2-3, in which the same molar ratio of Li and F as that in the present invention, and a reaction was carried in a short time under a low-temperature/atmospheric-pressure condition, it may be confirmed that since a sufficient reaction was not carried out as in comparative example 2-2, precipitates occur in the aqueous solution, the viscosity control was thereby impossible, and measurement of other major properties were impossible.

TABLE 2

| Id. | Molar ratio of precursor | | | | Crystallization reaction conditions | | | Viscosity (cP) | | Light transmittance Tt |
|---|---|---|---|---|---|---|---|---|---|---|
| | Si | Mg | Li | F | Temp. (° C.) | Pressure (bar) | Time (hr) | 6 hr | 24 hr | (%) |
| Example 1 | 8 | 6 | 1.5 | 3 | 85 | 1 | 40 | 3.9 | 5.4 | 92.3 |
| Example 2 | 8 | 6 | 1.5 | 4.5 | 85 | 1 | 40 | 130.8 | 320.8 | 93.2 |
| Example 3 | 8 | 6 | 3 | 3 | 85 | 1 | 40 | 7.2 | 11.4 | 93.1 |
| Example 4 | 8 | 6 | 3 | 3 | 85 | 1 | 20 | 10.8 | 12.0 | 92.4 |
| Example 5 | 8 | 6 | 5 | 5 | 85 | 1 | 40 | 48.6 | 103.8 | 93.1 |
| Comparative example 1 | 8 | 5.4 | 0.6 | — | 220 | 21.7 | 6 | 18.0 | 85.2 | 91.2 |
| Comparative example 2-1 | 8 | 6 | 1.68 | 0.56 | 90 | 1 | 80 | 15.0 | 397.1 | 81.7 |
| Comparative example 2-2 | 9 | 6 | 1.68 | 0.56 | 90 | 1 | 40 | Precipitation occurs | Precipitation occurs | Precipitation occurs |
| Comparative example 2-3 | 8 | 6 | 1.5 | 3 | 90 | 1 | 40 | Precipitation occurs | Precipitation occurs | Precipitation occurs |

* Precipitation occurs: Since a sufficient crystallization reaction has not been carried out, precipitation occurs in 2 wt % solution and the property measurement was thereby impossible.
* Tt: Total transmittance (%)

As shown in Table 2, it could be understood that by using the producing method of the present invention, in which a Li—Mg precipitate formation step was introduced, synthetic hectorite could be produced in a short time under a low-temperature/atmospheric pressure condition, and a 2 wt % aqueous solution of synthetic hectorite produced by using the producing method of the present invention also had a viscosity control effect and light transmittance of 90% or higher to thereby have an excellent water dispersibility.

It may be understood that the light transmittance of the synthetic hectorite of the present invention is superior to that of the synthetic hectorite produced by using a high-temperature/high-pressure producing method at 220° C. and 21.7 bar in comparative example 1.

Accordingly, it could be understood that by using the method for producing synthetic hectorite according to the present invention, synthetic hectorite could be simply, economically produced in a short time under a low-temperature/atmospheric pressure condition compared to related producing methods under a high-temperature/high-pressure condition, and exhibited more excellent major properties of the synthetic hectorite.

As such, it may be confirmed that the method for producing synthetic hectorite according to the present invention introduces a step of forming Li—Mg precipitates and may thereby ensure synthetic hectorite having excellent properties even under an improved low-temperature/atmospheric-pressure crystallization reaction condition, and controls the molar ratio of Li and F, and may thereby manufacture synthetic hectorite the properties of which may be easily controlled.

The above descriptions of the present invention have been provided as examples. Any one skilled in the art belonging to the present invention would well understand that the present invention may be easily modified into a specific form without changing the technical sprit and indispensable features. Therefore, embodiments described so far should be construed as nonrestrictive but exemplary in all respects.

The invention claimed is:

1. A method for producing synthetic hectorite, the method comprising the steps of:
   1) preparing a source solution mixture comprising a lithium (Li) source, a fluorine (F) source, and a magnesium (Mg) source;

2) adding a basic catalyst that is one or more selected from the group consisting of sodium hydroxide (NaOH), potassium hydroxide (KOH), calcium hydroxide (Ca(OH)$_2$), and ammonium hydroxide (NH$_4$OH), into the source solution mixture in an amount to adjust a pH of the source solution to 7 to 10 to form Li—Mg precipitates; and 3) adding a silica (Si) source into the Li—Mg precipitates and performing a crystallization reaction at a temperature of 70° C. to 85° C. under a pressure of 1 bar to 1.21 bar for 10 hours to 40 hours to yield the synthetic hectorite, wherein a molar ratio of the lithium source and the fluorine source is 1:1 to 1:10.

2. The method for producing synthetic hectorite of claim 1, wherein the silica source and the magnesium source are added in a molar ratio of 2:1 to 1:1.

3. The method for producing synthetic hectorite of claim 1, wherein a washing or filtering step is not performed prior to the crystallization of step 3).

4. The method for producing synthetic hectorite of claim 1, wherein the lithium source is one or more selected from the group consisting of lithium fluoride (LiF), lithium hydroxide (LiOH), lithium chloride (LiCl), lithium carbonate (Li$_2$CO$_3$), and lithium sulfate (Li$_2$SO$_4$).

5. The method for producing synthetic hectorite of claim 1, wherein the fluorine source is one or more selected from the group consisting of hydrofluoric acid (HF), sodium fluoride (NaF), fluosilicic acid ((H$_3$O)$_2$(SiF$_6$)), and sodium silico fluoride (Na$_2$(SiF$_6$)).

6. The method for producing synthetic hectorite of claim 1, wherein the magnesium source is one or more selected from the group consisting of magnesium carbonate (MgCO$_3$), magnesium sulfate (MgSO$_4$), magnesium chloride (MgCl$_2$), and magnesium hydroxide (Mg(OH)$_2$).

7. The method for producing synthetic hectorite of claim 1, wherein the crystallization reaction is performed at a temperature of 85° C. under a pressure of 1 bar for 40 hours.

\* \* \* \* \*